United States Patent [19]

Heltzel

[11] 4,085,850
[45] Apr. 25, 1978

[54] SINGLE LOAD CELL WEIGH HOPPER SYSTEM

[76] Inventor: Carl J. Heltzel, 523 Country Club Dr. NE., Warren, Ohio 44484

[21] Appl. No.: 750,126

[22] Filed: Dec. 13, 1976

[51] Int. Cl.² ............................................. G01G 13/22
[52] U.S. Cl. ........................................ 214/2; 177/255; 214/17 R
[58] Field of Search ................... 214/2, 17 R; 222/77; 177/1, 91, 255

[56] References Cited

U.S. PATENT DOCUMENTS

| 3,097,711 | 7/1963 | Clark | 214/2 X |
| 3,869,007 | 3/1975 | Haggstrom et al. | 177/255 X |
| 3,966,000 | 6/1976 | Allen | 177/91 X |

Primary Examiner—Robert G. Sheridan
Attorney, Agent, or Firm—Wilkinson, Mawhinney & Theibault

[57] ABSTRACT

The present disclosure is directed to arranging a weigh hopper in a free floating manner in a rigid frame so that the hopper either rests upon a load cell or pulls on a load cell while the hopper is free to move up and down in a rigid frame only influenced by flexing aligning rods which are not rigidly secured to the weigh hopper but are secured to the rigid frame. This structure eliminates the usual multiplicity of load cells common to this art.

1 Claim, 6 Drawing Figures

SINGLE LOAD CELL WEIGH HOPPER SYSTEM

An object of the present invention is to provide a weigh hopper system requiring only a single load cell. The prior art has advanced systems requiring from two to four load cells in connection with individual weigh hoppers.

A further object of the present invention is to provide a weigh system in which the weigh hopper is suspended in a rigid frame wherein the hopper effectively floats relative to the hopper support frame because the support of the weigh hopper is in either tension, when load cell is in physical series with the hopper suspension or in compression when the weigh hopper rests upon the load cell. In either condition the rigid frame has hopper aligning members or rods to assist maintaining the hopper in direct line with the load cell, the aligning rods acting only to assure a non-load bearing transfer and hence load error reading between the weigh hopper and its surrounding rigid frame.

Another object of the present invention is to provide a single load cell weigh system which may be either suspended from a bulk dispensing hopper or created on support legs when the weigh hopper is charged other than by bulk bin means.

With the foregoing and other objects in view the invention will be more fully described hereinafter and more particularly pointed out in the appended claims.

In the drawings in which like parts are denoted by reference characters throughout the several views.

Figure 1:
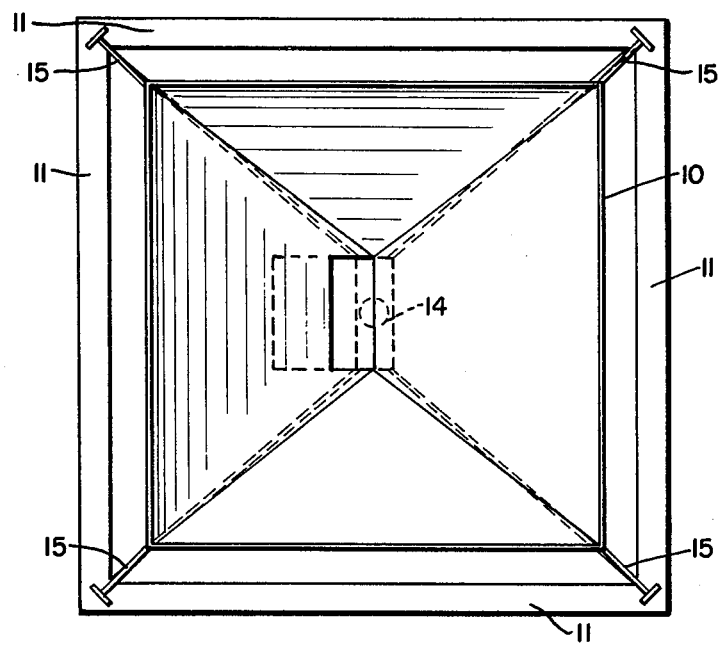
FIG. 1 is a top plan view of the system of the present invention showing the hopper within a rigid frame under the influence of the aligning rods.
Figure 2:
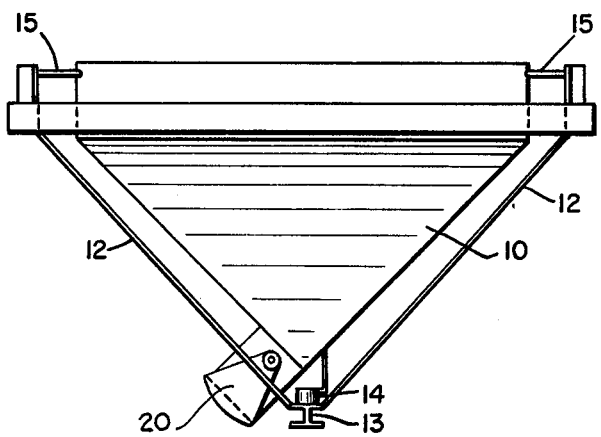
FIG. 2 is a side elevational view of the form of the invention shown in FIG. 1 with the weigh hopper resting directly upon the load cell.
Figure 3:
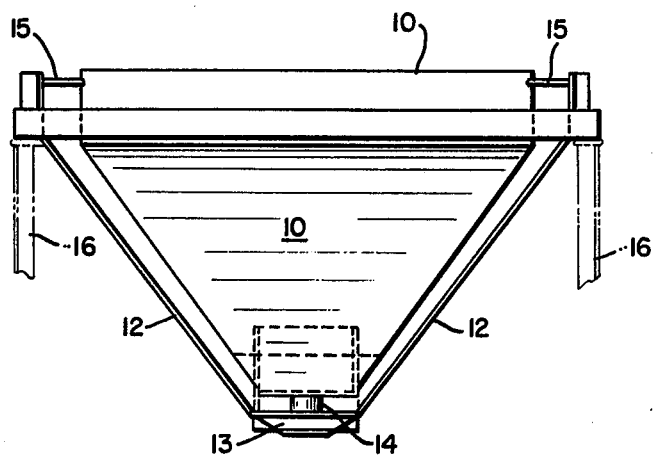
FIG. 3 is an end elevational view of FIG. 2 showing the rigid frame supported on legs.

Referring now to FIGS. 1 through 3 of the drawings, 10 designates a weigh hopper having a discharge gate 20 which is completely surrounded by a rigid frame 11. At each corner of the frame 11 are load cell support brackets 12 which angle down completely free of hopper 10 to a load cell bracket 13 on which rests a single load cell 14. Spaced above the rigid frame 11 at its four corners are weigh hopper aligning rods 15 only one end of each rod 15 is connected to the rigid frame 11, the other end of each rod only bearing against the hopper, not rigidly connected thereto. These rods 15 serve only as aligning guides for the up and down movement of the hopper.

Immediately above the load cell bracket 13 rests the load cell 14 which is engaged by a compatible bracket at the base of the hopper 10 so that the entire weight of the hopper 10 and its load are concentrated on the single load cell 14.

Since the hopper 10 is completely free of the rigid frame 11, the top of the hopper 10 is aligning by the aligning rods 15. These rods 15 must be able to flex slightly in the vertical position. Even under full load of the hopper 10 the movement of the load cell 14 would only be of the order of 0.003 of an inch. The rigid frame 11 can either be supported at the four corners by legs 16 or suspended from a bulk bin or overhead fixture by rods.

Figure 4:
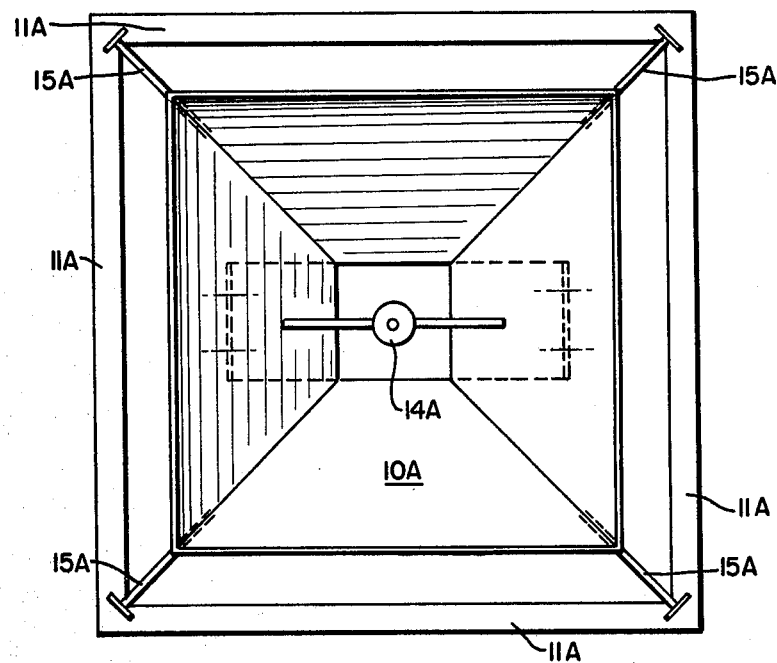
FIG. 4 is a top plan view of the system of the present invention showing the weigh hopper supported within a rigid frame, with its load carried on a load cell in tension.
Figure 5:
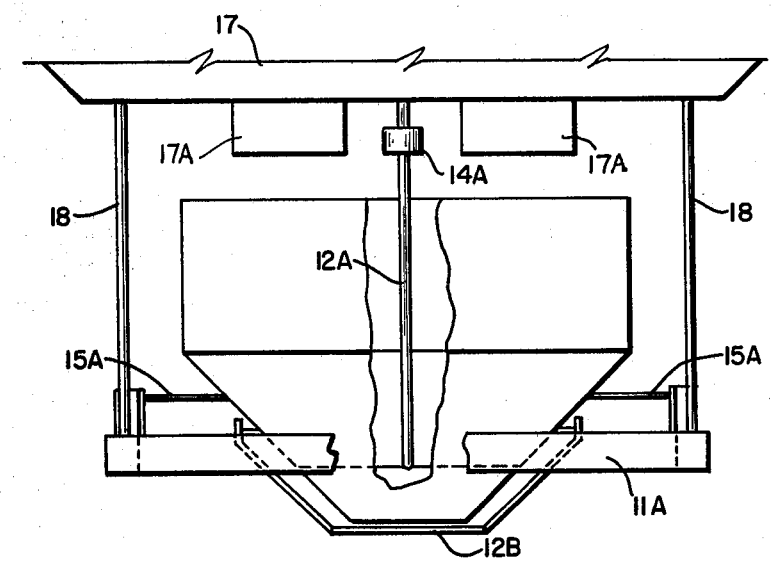
FIG. 5 is a side elevational view of the form of invention shown in FIG. 4.
Figure 6:
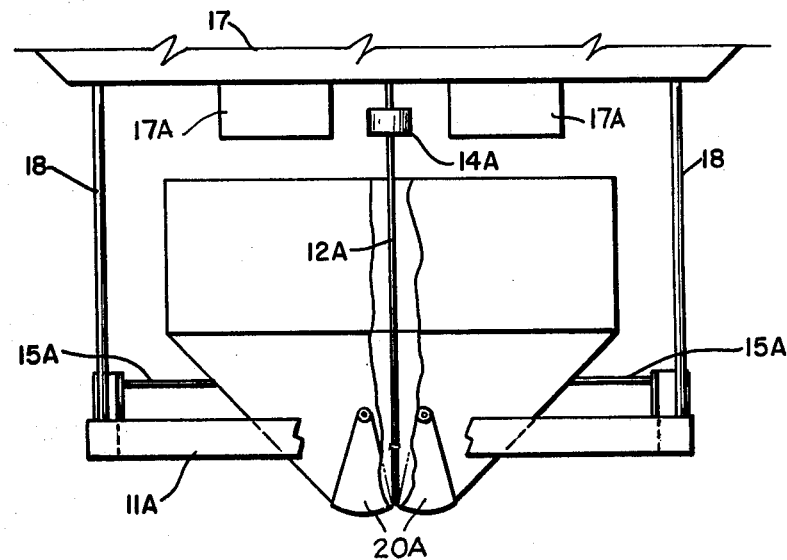
FIG. 6 is an end elevational view of the form of invention shown in FIG. 4.

Referring now to FIGS. 4 through 6, the weigh hopper 10A having discharge gates 20A is completely surrounded by a rigid frame 11A. The load cell 14A is supported on a load cell rod 12A which is located on the central vertical axis. It is supported or connected to the hopper 10 by a hopper support plate 12B and at the top of the load cell rod 12A is connected to a bin structure 17 having discharge outlet means 17A. The hopper 10A is completely free of the rigid frame 11A and it is necessary to stabilize the top of the hopper 10A by use of the aligning rods 15A which are located at the four corners of the rigid frame 11A.

The rigid frame 11A can be either suspended from a bin 17 by suspension rods 18 or could be fitted with legs.

What I claim is:

1. A weigh hopper stabilizing and weighing system comprising:
   a. a weigh hopper,
   b. a rigid frame about said weigh hopper,
   c. a single load cell,
   d. load cell support means connected to said rigid frame positioning said single load cell so that said weigh hopper bears directly thereon,
   e. weigh hopper aligning rods one end of each of which is secured to said rigid frame and the other end of which engages the hopper but it is not secured thereto but are spaced about the weigh hopper for centering the weigh hopper over and upon the load cell, and
   f. a bulk material bin having discharge outlet means, rigid spacer means connected to space said rigid frame and weigh hopper below said bin discharge outlet means, said load cell support means being a spider frame having a central rod with the single load cell connected between said spider frame and the bulk bin.